(12) United States Patent
Ullah et al.

(10) Patent No.: US 6,322,081 B1
(45) Date of Patent: Nov. 27, 2001

(54) CIRCUMFERENTIAL SEAL WITH CERAMIC ROTOR

(75) Inventors: M Rifat Ullah, Phoenix; Michael F. O'Brien, Goodyear; Fred Fuller, Phoenix, all of AZ (US); Gary Boyd, Durango, CO (US)

(73) Assignee: Ceramic Engineering Consulting, Inc., Durango, CO (US)

( * ) Notice: Subject to any disclaimer, the term of this patent is extended or adjusted under 35 U.S.C. 154(b) by 0 days.

(21) Appl. No.: 08/903,185

(22) Filed: Jul. 11, 1997

Related U.S. Application Data

(63) Continuation of application No. 08/588,825, filed on Jan. 19, 1996, now abandoned.

(51) Int. Cl.[7] .................................................. F16J 15/16
(52) U.S. Cl. .......................................... 277/504; 277/506
(58) Field of Search .................................... 277/403, 433, 277/500, 503, 504, 506

(56) References Cited

U.S. PATENT DOCUMENTS

| | | | |
|---|---|---|---|
| 2,937,039 | 5/1960 | Santapa | 286/11.15 |
| 3,285,614 | * 11/1966 | McClenathan . | |
| 3,502,343 | * 3/1970 | Pustelnik | 277/84 |
| 3,652,183 | 3/1972 | Pottharst, Jr. | 415/170 |
| 3,770,181 | 11/1973 | Stahl | 277/96 |
| 3,797,899 | * 3/1974 | Anderson . | |
| 3,822,066 | 7/1974 | Keys . | |
| 3,895,811 | 7/1975 | Richard, Jr. et al. . | |
| 3,907,308 | * 9/1975 | Stock . | |
| 3,926,443 | 12/1975 | Fenerty et al. | 277/96 |
| 4,036,505 | 7/1977 | Floyd et al. | 277/96.2 |
| 4,174,844 | 11/1979 | Zobens | 277/85 |
| 4,196,912 | 4/1980 | Quitberg | 277/81 R |
| 4,212,473 | 7/1980 | Arai | 277/81 P |
| 4,243,233 | 1/1981 | Arai | 277/81 R |
| 4,279,424 | * 7/1981 | Zerlauth | 277/84 |
| 4,323,255 | 4/1982 | Wiese | 277/81 R |
| 4,336,944 | 6/1982 | Blair | 277/81 R |
| 4,415,165 | 11/1983 | Martini | 277/27 |
| 4,484,752 | * 11/1984 | Bentley | 277/84 |
| 4,515,377 | * 5/1985 | Johnson . | |
| 4,659,092 | * 4/1987 | Wallace et al. | 277/84 |
| 4,759,554 | 7/1988 | Kemp et al. | 277/65 |
| 4,836,559 | * 6/1989 | Bihlmaier . | |
| 4,973,065 | 11/1990 | Habich | 277/87 |
| 4,998,739 | * 3/1991 | Weiler . | |
| 5,014,999 | * 5/1991 | Makhobey | 277/198 |
| 5,017,022 | 5/1991 | Ruggles et al. . | |
| 5,133,562 | 7/1992 | Lipschitz . | |
| 5,183,270 | 2/1993 | Alten et al. | 277/81 R |
| 5,263,724 | * 11/1993 | Hansen et al. | 877/96.1 |

FOREIGN PATENT DOCUMENTS

| | | |
|---|---|---|
| 3925403 A1 | 1/1991 | (DE) . |
| 0 571 791 A1 | 5/1993 | (EP) . |

* cited by examiner

*Primary Examiner*—Anthony Knight
*Assistant Examiner*—John L. Beres
(74) *Attorney, Agent, or Firm*—Cahill, Sutton & Thomas P.L.C.

(57) ABSTRACT

A circumferential seal for sealing between a rotating shaft and a stationary housing circumscribing the shaft. The seal comprises a stator mounted to said housing and having a radially inward facing carbon portion and a rotor with a ceramic sealing member having a radially outward facing surface in rubbing contact with said carbon portion. The rotor also includes a metal clamping means for mounting the ceramic sealing member to the shaft. The clamping means includes an axial flexible clamping member, and a radial flexible clamping member that together clamp onto a mounting flange of the ceramic sealing member when exposed to the compressive force of a lockup assembly.

18 Claims, 3 Drawing Sheets

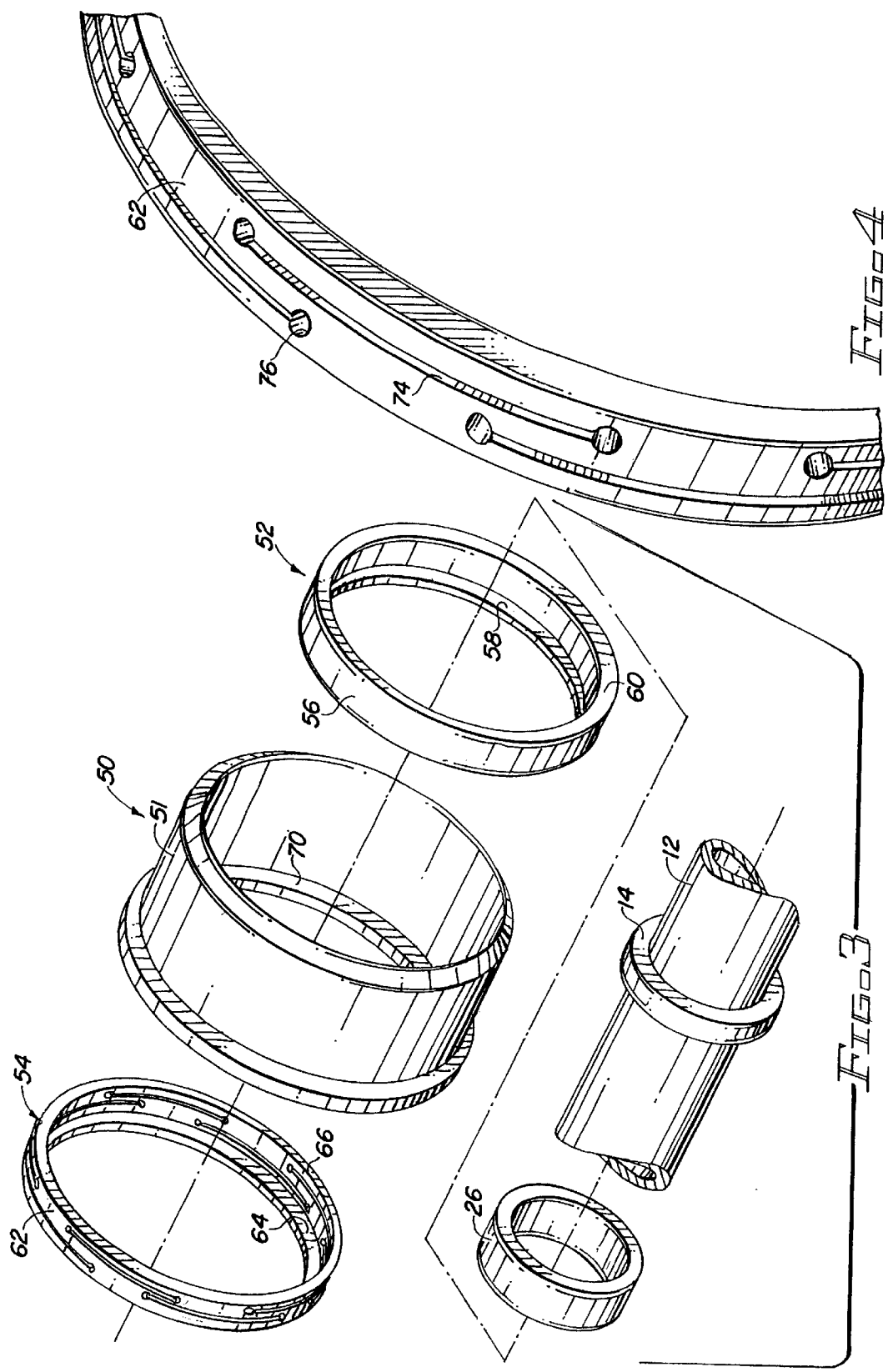

CIRCUMFERENTIAL SEAL WITH CERAMIC ROTOR

This is a continuation of application Ser. No. 08/588,825, filed Jan. 19, 1996, now abandoned.

TECHNICAL FIELD

The present invention relates generally to circumferential seals used for sealing along rotating shafts, and in particular, to a circumferential seal having a ceramic seal rotor flexibly mounted to a rotating shaft.

BACKGROUND OF THE INVENTION

Circumferential seals are used, for example, in gas turbine engines to prevent leakage of fluid along the engine's rotating shaft where the shaft extends through a wall or partition. Referring to FIG. 1, a typical circumferential seal includes a rotating component called a seal rotor 20 and a non-rotating component called a seal stator 31. The rotor 20 is made of metal and is mounted to a rotating shaft 12. It also has a radially, outward facing sealing surface 21. The seal stator 31 includes a metal ring 35 mounted to the housing 34 and a carbon sealing ring 36 mounted to its radial inward facing surface. The stator 31 and rotor 20 are arranged so that the carbon ring 36 circumscribes the sealing surface 21 so as to seal a leakage path represented by arrow 38. To avoid damage to the carbon ring 36, a small radial gap is maintained between the ring 36 and sealing surface 21.

A common problem associated with these seals occurs as a result of variation in the radial gap between the carbon ring 36 and sealing surface 21. This variation is due in part to the mechanical growth of the rotor 20 due to centrifugal effects, but more significantly due to a disparity in thermal growth between the metal rotor and the carbon ring in response to changes in temperature. This disparity results from the two components having different coefficients of thermal expansion. The variation in the radial gap produces undesirable effect either when the radial gap is too wide open, or if it is allowed to completely close.

If the gap becomes too large, the amount of leakage through the seal increases resulting in reduced efficiency. In addition, the increased flow can adversely affect the control of pressures in neighboring cavities and hamper the intended use of the high-pressure air therein. However, if the gap is too small then substantial contact between the carbon ring and rotor can occur which can quickly damage either or both components.

One proposal for improving seal performance is to make the seal rotor from titanium, which has one of the lowest thermal expansion coefficients of any metal, and additionally satisfies strength requirements for a seal rotor. The differential thermal growth between a titanium rotor and carbon ring is substantially less than that of a seal with a more conventional nickel or iron based alloy rotor, however, it is not reduced enough to significantly improve seal performance. This is primarily due to the fact that although the thermal expansion coefficient of titanium is low for a metal, it is still much higher than that of carbon. Further, the titanium is substantially less durable than conventional rotor alloys, and thus more susceptible to damage upon contact with the stator.

Another proposal is to actively cool the rotor. A seal rotor can be cooled by providing a flow of cooling oil over its inside surfaces. This has the beneficial effect of reducing the rotor's temperature, and correspondingly reducing its thermal growth. By actively controlling the rotor's thermal growth in this way, the differential growth between the stator and rotor can be minimized. One disadvantage to an active cooling system is the added design complexity required for providing the means to deliver the oil to the runner, and the additional costs associated with that complexity. Another disadvantage is an increased risk of contamination of the air side of the seal due to the additional supply of oil in close proximity to the seal interface.

Accordingly, a need exists for a circumferential seal having a seal rotor with adequate mechanical properties and low enough thermal and mechanical growth during engine operation so that the rotor closely tracks the thermal growth of the carbon ring without the use of external cooling, and so that damage due to contact of the carbon ring and rotor is minimized.

SUMMARY OF THE INVENTION

An object of the invention is to provide a circumferential seal in which the engagement between the carbon ring and the rotor remains substantially constant in the presence of varying temperature.

The present invention achieves the above-stated object by providing a circumferential seal having a stator with a radially inward facing carbon portion and a rotor with a ceramic sealing member having a radially outward facing surface in rubbing contact with said carbon portion. The rotor also includes a metal clamping means for mounting the ceramic sealing member to a rotating shaft. The clamping means includes an axial flexible clamping member, and a radial flexible clamping member that together clamp onto a mounting flange of the ceramic sealing member when exposed to the compressive force of a lockup assembly.

The thermal and mechanical growth characteristics of the ceramic sealing member are substantially similar to the thermal growth of the carbon seal portion. Thus, the ceramic sealing member is able to maintain rubbing contact with the carbon portion despite varying temperature. Further, the clamping means isolates the ceramic sealing member from the compressive force of the lockup assembly, thereby avoiding damage to the ceramic sealing member.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

FIG. 3 is an exploded perspective view of the circumferential seal of FIG. 2.

FIG. 4 is an enlarged view of a portion of the circumferential seal of FIG. 2.

DESCRIPTION OF THE PREFERRED EMBODIMENT

Figure 1:
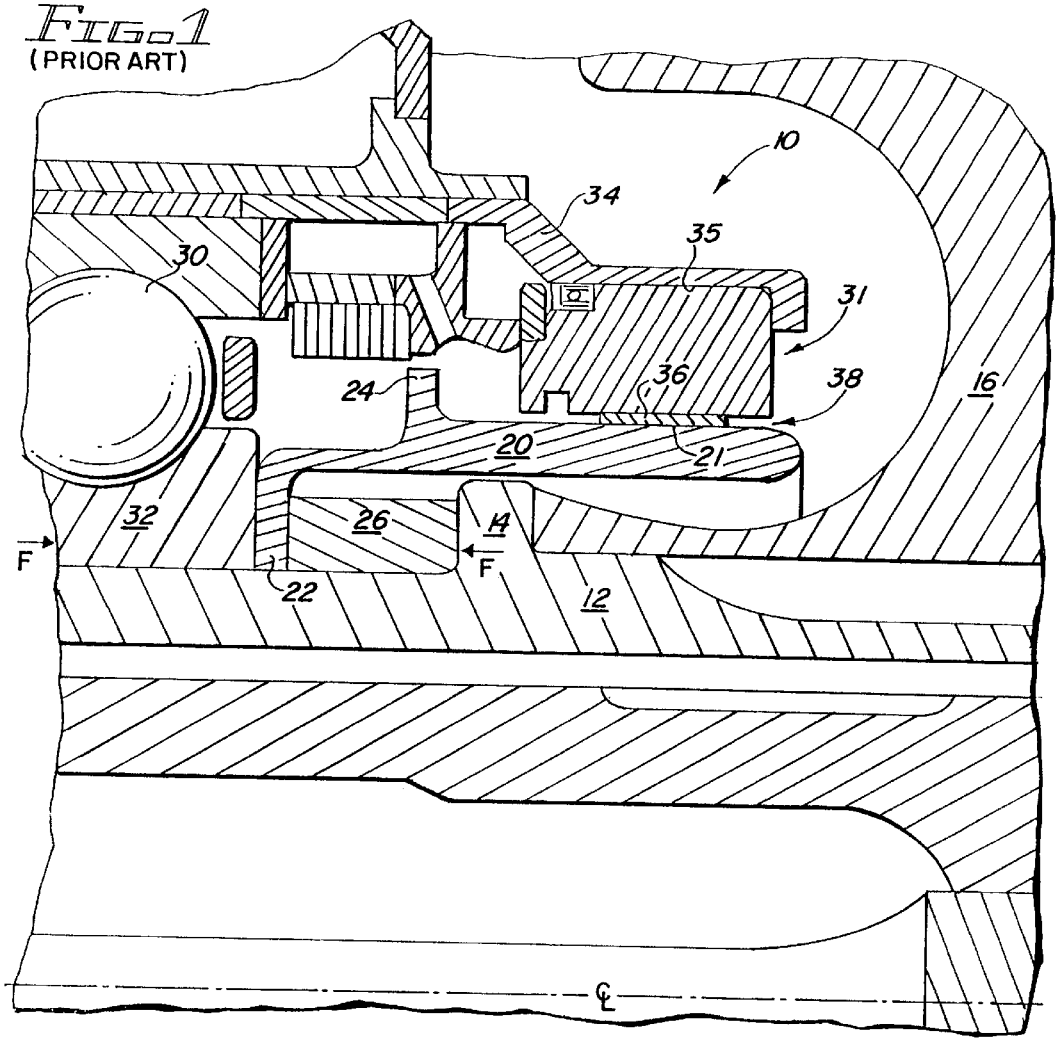
FIG. 1 is a cross-sectional view of a portion of a gas turbine engine having a prior art circumferential seal.
Figure 2:
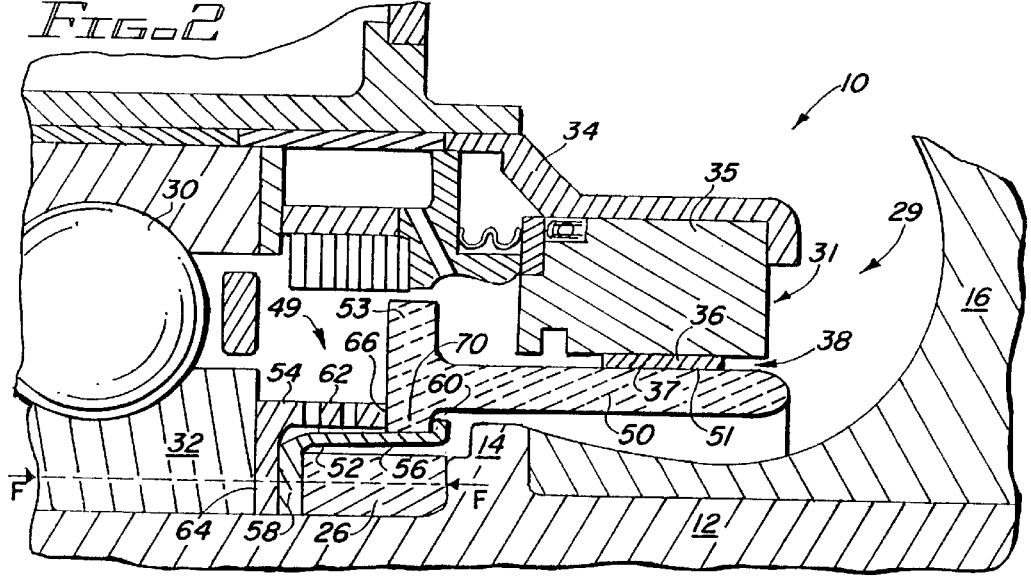
FIG. 2 is a cross-sectional view of a portion of a gas turbine engine having a circumferential seal contemplated by the present invention.

Referring to the drawings, FIG. 2 shows a section of a gas turbine engine generally denoted by the reference numeral 10. The section 10 includes a rotating shaft 12 on which rotating engine components, such as the radial compressor wheel 16, are mounted. Circumscribing the shaft 12 is a stationary housing 34. The housing 34 is mounted atop a bearing 30 having an inner race 32 which is mounted on the shaft 12. Disposed between the housing 34 and shaft 12 is a circumferential seal 29. The seal 29 includes a conventional stator 31 having a metal ring 35 mounted to the housing 34 and a carbon sealing ring 36 mounted to its radial inward facing surface. Alternatively, the carbon portion may be embedded in the ring 35. The carbon sealing ring 36 has a radially inward facing curved surface 37.

The seal 29 also includes a novel sealing rotor 49. The rotor 49 includes a ceramic, preferably silicon nitride, cylindrical member 50 having a radially outward facing curved sealing surface 51 in rubbing contact with the radially inward facing curved surface 37 of carbon ring 36 to control leakage air flow represented by arrow 38. At one axial end, the member 50 has radially outward extending flange 53 which acts as an oil slinger preventing oil flowing through the bearing 30 from reaching the sealing surface 51. At this same axial end, the member 50 has a radially inward extending mounting flange 70 having axial faces adapted to receive an axial clamping load. The rotor 49 further includes two metallic, annular clamping members 52, and 54 for providing this clamping load.

Clamping member 52 includes a cylindrical portion 56 having a radially inwardly extending flange 58 at one end, and a radially outwardly extending lip 60 at the other end. The length and thickness of the cylindrical portion 56 are selected to impart radial flexibility to the clamping member 52. That is the cylindrical portion 56 acts as a cantilevered beam rigidly fixed at the flange 58. To achieve the desired radial flexibility the ratio of thickness-length for the cylindrical portion 56 should preferably be less than one fifth.

Clamping member 54 has a cylindrical portion 62 having a radially inward extending flange 64 at one end, and an axial face 66 at the other end. As shown in FIG. 4, the cylindrical portion 62 has a plurality of circumferentially extending slots 74 that extend through the portion 62. The slots 74 impart axial flexibility to the portion 62 allowing it to compress and expand like a coil spring in a mattress. Though not essential, at the circumferential end of each slot 74 is a hole 76 having a diameter about twice the width of the slot. The holes 76 act to relieve stress concentration when the cylindrical portion 56 is axially loaded.

Referring to FIG. 3, during assembly of the engine 10 a spacer 26 is placed over the shaft 12 such that it axially abuts the shoulder 14. Clamping member 52 is then slid over the spacer 26 until the flange 58 contacts the spacer 26. The ceramic member 50 is then installed over the shaft 12 and member 52 so that one of the axial faces of flange 70 contacts the lip 60. Preferably, the cylindrical portion 56 of clamping member 52 is tapered such that as member 50 nears the lip 60 a radial interference is encountered, resulting in a slight radial press fit when fully installed. The slight radial press ensures accurate radial positioning of the ceramic member 50. The taper should be no more than fifteen degrees from the axial direction. Clamping member 54 is installed next by sliding it over shaft 12 and member 52, until its axial face 66 abuts the other axial face of flange 70. The dimensions of member 54 are selected such that an axial gap is formed between flange 64 and flange 58.

The bearing 30 and other rotating components are then mounted onto the shaft 12. The last item to be mounted on the shaft 12 is a nut, not shown, that is torqued down thereby generating an axial compressive force, represented by arrow F of about 30,000 lbs. This force is transmitted to the other components mounted on shaft 12 and in particular through the inner race 32, then flange 64, then flange 58, then spacer 26, and then taken out against shoulder 14. Thus, the inner race 32, flange 64, flange 58, and spacer 26 become a compressed stack much the same as a stack of washers placed over a bolt become compressed against the bolt head by tightening a nut down onto the stack. This stacking of components under load is referred to as a lockup assembly. When the compressive load is applied via the lock-up assembly, the axial gap between flanges 64 and 58 is closed, placing cylindrical portion 62 in compression thereby clamping onto flange 70 of ceramic member 50. An important advantage to this arrangement is that the ceramic member 50 is never exposed to the compressive load F due to the axial flexibility of member 54 provided by slots 74.

Thus, the circumferential seal 29 provides substantially improved sealing efficiency over the prior art by virtue of the ceramic member 50. The thermal growth of the ceramic is low due to its low coefficient of thermal expansion. The mechanical radial growth due to centrifugal forces is also low due to the high stiffness-to-weight ratio of the ceramic. Thus, the ceramic member 50 is able to closely track the carbon portion 36 resulting in a more constant gap therebetween throughout the entire operating envelope of the engine 10.

Alternatively, because the frictional and wear properties of the ceramic-to-carbon interface are substantially improved over the prior art, the sealing surface 51 can be in rubbing contact with the carbon portion 36, rather than the intermittent rubbing contact of the prior art. Thus, depending on the particular application, the sealing arrangement between the sealing surface 51 and the carbon portion 36 can be rubbing contact or nonrubbing contact with a gap therebetween. The latter is useful in application where a small amount of leakage can be tolerated.

Figure 5:
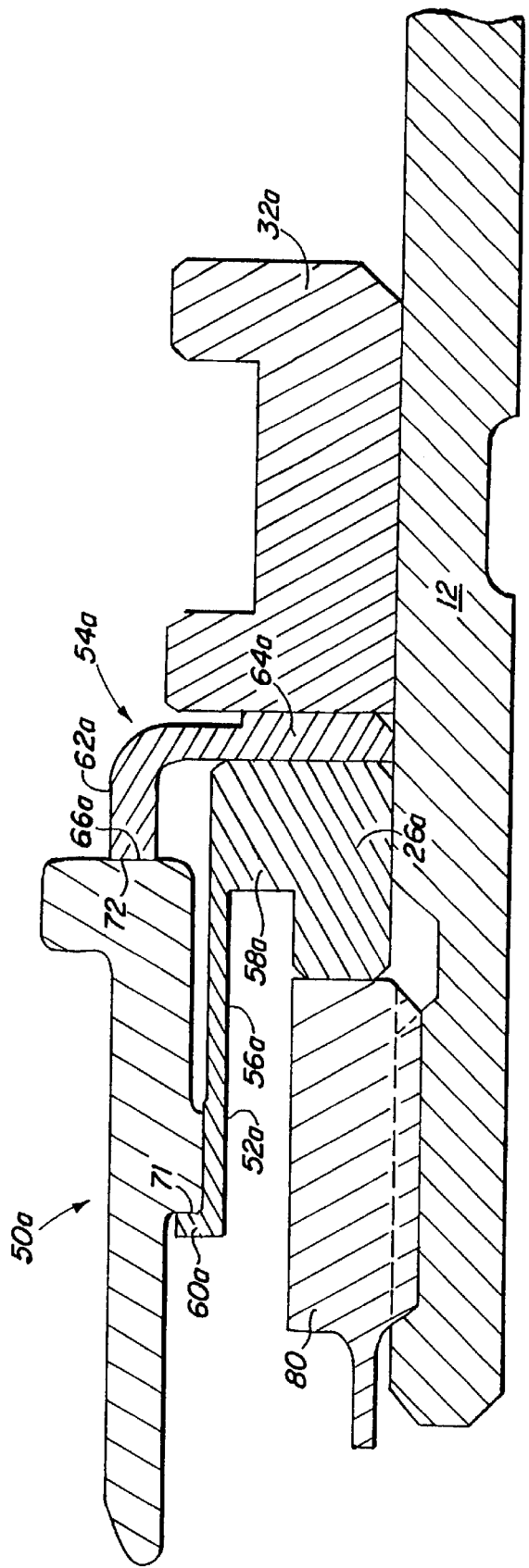
FIG. 5 is a cross-sectional view of an alternate embodiment of the circumferential seal of FIG. 2.

In an alternative embodiment of the seal assembly, shown in FIG. 5, a ceramic member 50a is clamped between two metallic clamping members 52a and 54a. Ceramic member 50a includes axial faces 71 and 72 as shown, adapted to receive an axial clamping load. Radially flexible member 52a has a thin cylindrical portion 56a having a radially outward extending lip 60a for clamping to face 71 at one end, and a radially inward extending flange portion 58a for mounting to a rotating shaft 12 at the other end. Flange portion 58a incorporates an integral spacer portion 26a for axially positioning the components.

Axially flexible member 54a has a cylindrical portion 62a having circumferentially extending slots (not shown) for providing axial flexibility; a flange portion 64a extending radially inward from one end for mounting to shaft 12; and a surface 66a at the other end for applying the axial clamp load to face 72. A lockup assembly is created by torquing down a nut 80, thereby axially loading spacer portion 26a, flange portion 64a, bearing inner race 32a, and one or more additional rotating components not shown, against a shoulder (not shown) of shaft 12. The lockup assembly causes ceramic member 50a to be flexibly clamped between lip 60a and face 66a in the same manner as described above for the preferred embodiment.

Other modifications and alterations to the above described embodiments will be apparent to those skilled in the art. Accordingly, this description of the invention should be considered exemplary in nature and not as limiting to the scope and spirit of the invention which should be determined from the following claims.

What is claimed is:

1. A gas turbine engine assembled in a lockup and including a circumferential seal for sealing between an axially extending rotating shaft and a housing circumscribing the shaft, said seal comprising:
   a seal stator for mounting to said housing and having a carbon portion with a radially inward facing curved surface; and
   a seal rotor having a metal clamping member for mounting to said shaft, and a ceramic sealing member mounted to said metal clamping member, said ceramic sealing member having a radially outward facing curved surface in sealing arrangement with said curved surface of said carbon portion.

2. The seal of claim 1 wherein said ceramic sealing member has first and second axially facing mounting surfaces.

3. The seal of claim 2 wherein said metal clamping member is held on said shaft by a compressive force generated by a lockup assembly.

4. A circumferential seal for sealing between an axially extending rotating shaft and a housing circumscribing the shaft, said seal comprising:
   a seal stator for mounting to said housing and having a carbon portion with a radially inward facing curved surface; and
   a seal rotor having a metal clamping member for mounting to said shaft, and a ceramic sealing member mounted to said metal clamping member, said ceramic sealing member having first and second axially facing mounting surfaces and a radially outward facing curved surface in sealing arrangement with said curved surface of said carbon portion,
   wherein said metal clamping member is held on said shaft by a compressive force generated by a lockup assembly, and said metal clamping member comprises:
      a first annular, axially flexible, clamping member mounted to said shaft and having a first axially facing surface in contact with said first axially facing mounting surface of said ceramic sealing member; and
      a second annular, radially flexible, clamping member mounted to said shaft and having a second axially facing surface in contact with said second axially facing mounting surface of said ceramic sealing member, whereby upon the application of said compressive force to said first and second clamping members, said first clamping member is placed in compression and said second clamping member is placed in tension thereby clamping onto said ceramic sealing member.

5. The seal of claim 4 wherein said first and second clamping members are adjacent.

6. The seal of claim 4 wherein said first clamping member comprises:
   a first annular flange having a radial inner end defining a first hole for receiving said shaft and having a radial outer end; and
   a first cylindrical member extending axially from said radial outer end of said first annular flange and terminating at said first axially facing surface in contact with said first mounting surface.

7. The seal of claim 6 wherein said first cylindrical member has a plurality of circumferentially extending slots.

8. The seal of claim 7 wherein each of said slots terminates at a stress relief hole.

9. The seal of claim 8 wherein said stress relief holes have a diameter about twice the width of said slots.

10. The seal of claim 4 wherein said second clamping member comprises:
    a second annular flange having a second hole for receiving said shaft; and
    a second cylindrical member extending axially from a radial outer end of said second annular flange to a radially outward extending lip, said lip defining said second axially facing surface in contact with said second mounting surface.

11. The seal of claim 10 wherein the ratio of thickness-to-length for said second cylindrical member is no more than one fifth.

12. The seal of claim 11 wherein said second cylindrical portion is tapered.

13. The seal of claim 12 wherein said taper is no more than fifteen degrees from the axial direction.

14. The seal of claim 2 wherein said ceramic sealing member has at a first axial thereof end a radially outward extending flange for drawing oil away from said circumferential seal face.

15. The seal of claim 14 wherein said ceramic sealing member has a radially inward extending mounting flange providing one or both of said first and second mounting surfaces.

16. A seal rotor for use in a circumferential seal comprising:
    a metal clamping means adapted for mounting to a shaft; and
    a ceramic sealing member mounted to said clamping member and having a radially outward facing curved sealing surface;
    said clamping means comprising:
       a radially flexible, axially extending cylinder member having a first axial end from which a first annular flange extends radially inward for receiving said shaft, said radially flexible cylinder member having a lip extending radially outward from a second axial end to define a first axially facing surface;
       an axially flexible, axially extending cylinder member having a third axial end from which a second annular flange extends radially inward for receiving said shaft, said axially flexible cylinder member having at its other axial end a second axially facing surface axially spaced from said first axially facing surface; and
       said ceramic sealing member having mounting surfaces for mounting said sealing member between said first and second axially facing surfaces.

17. The seal of claim 1 wherein said sealing arrangement is rubbing contact.

18. The seal of claim 1 wherein said sealing arrangement is non-rubbing contact.

* * * * *